United States Patent [19]

Kondo

[11] Patent Number: 4,603,462
[45] Date of Patent: Aug. 5, 1986

[54] JOINING JIG FOR VEHICLE BODY PANELS

[75] Inventor: Takumi Kondo, Fukuoka, Japan

[73] Assignee: Nissan Motor Co., Ltd., Japan

[21] Appl. No.: 578,263

[22] Filed: Feb. 8, 1984

[30] Foreign Application Priority Data

Feb. 15, 1983 [JP] Japan ................................. 58-24441

[51] Int. Cl.$^4$ ............................................. B25B 5/14
[52] U.S. Cl. .................................... 29/281.1; 269/25;
269/43; 269/87.2; 228/49.1
[58] Field of Search .................... 29/281.1, 281.3, 272;
269/25, 43, 266, 87, 87.1, 87.2; 228/46, 44.1, 49
R, 153

[56] References Cited

U.S. PATENT DOCUMENTS

| | | | |
|---|---|---|---|
| 2,354,794 | 8/1944 | Buehler | 269/25 |
| 2,393,198 | 1/1946 | Somerville | 228/46 X |
| 4,520,919 | 6/1985 | Keitaro | 269/25 X |

Primary Examiner—Frederick R. Schmidt
Assistant Examiner—Steven P. Schad
Attorney, Agent, or Firm—Leydig, Voit & Mayer, Ltd.

[57] ABSTRACT

A joining jig for use in joining automotive vehicle body outer panels is composed of first and second contact members whose contact surfaces are contactable respectively with inside and outside faces of a joint section of the body panels. Both the contact members are so biased that their contact surfaces contact with the corresponding faces of the joint section under the action of a relatively high biasing force, when a brazing operation is carried out. An additional biasing device is provided for lightly biasing the first and second contact members so that their contact surfaces contact with the corresponding faces of the joint section under the action of a relatively low biasing force, prior to the biasing under the action of the relatively high biasing force, thereby enabling a precise location of the joining jig contact surfaces relative to the joint section.

9 Claims, 7 Drawing Figures

JOINING JIG FOR VEHICLE BODY PANELS

BACKGROUND OF THE INVENTION

1. Field of the Invention

This invention relates to a joining jig for use in joining adjoining panels of an automotive vehicle body, particularly outer panels of a rear quarter section of the vehicle body.

2. Description of the Prior Art

In connection with joining jigs for use in joining two adjoining panels, ones equipped with manually or hydraulically operated biasing device have been heretofore put into practical use. The joining jig equipped with the manually operated biasing device has two opposite contact surfaces which are manually respectively biased to contact with the inside and outside faces of a joint section. The joining jig equipped with the hydraulically operated biasing device also has two opposite contact surfaces which are hydraulically biased in the same manner as stated above.

However, the former one is unstable in biasing force and therefore there is a possibility of producing thermal strain in the joint section. Otherwise, the latter one is usually not provided with a device for accomplishing a precise location of the joining jig relative to the joint section, so that an unevenness will be formed on the vehicle body outer panels when a hydraulic cylinder is operated in the condition where joining jig location has not yet precisely accomplished.

SUMMARY OF THE INVENTION

A joining jig according to the present invention is for use in joining adjoining panels of an automotive vehicle body and comprises first and second contact sections. The first contact section is provided with a first contact surface contactable with an inside face of a joint section of the adjoining panels while the second contact section is provided with a second contact surface contactable with an outside face of the joint section. A first biasing device is provided to strongly contact the first and second surfaces respectively with the corresponding faces of the joint section under the action of a first biasing force when operated. Additionally, a second biasing device is provided to lightly contact the first and second surfaces respectively with the corresponding faces of the joint section under the action of a second biasing force lower than the first biasing force, prior to the operation of the second biasing device, thereby enabling a precise location of the contact surfaces of the joining jig relative to the joint section. Accordingly, there is no possibility of causing an unevenness on the vehicle body panels while preventing thermal strain to be caused in the joint section.

BRIEF DESCRIPTION OF THE DRAWINGS

The features and advantages of the joining jig according to the present invention will be more clearly appreciated from the following description taken in conjunction with the accompanying drawings in which like reference numerals designate corresponding parts and elements, and in which.

DETAILED DESCRIPTION OF THE INVENTION

Figure 2:
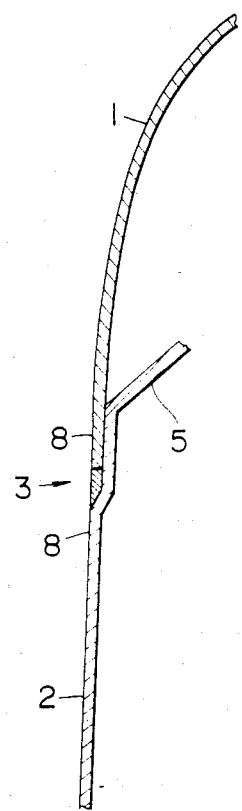
FIG. 2 is a cross-sectional view of the joint section of FIG. 1.
Figure 3:
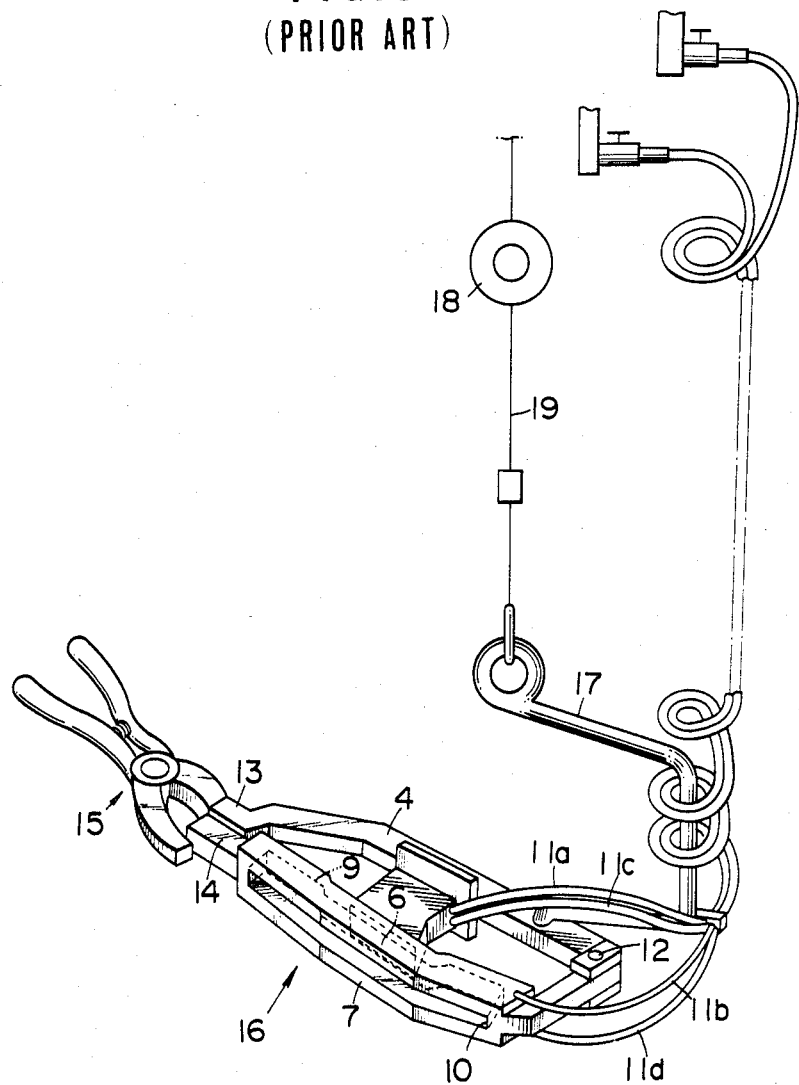
FIG. 3 is a perspective view of a conventional joining jig equipped with a manually operated biasing device, for use in joining vehicle body outer panels.

To facilitate understanding the present invention, a brief reference will be made to conventional joining jigs 16, 21 depicted in FIGS. 3 and 4. The joining jigs 16, 21 are arranged to join adjoining panels 1, 2 to form a joint section 3 of the joggled lap joint type providing a padding on the joint section by a brazing method as shown in FIG. 2. The joining panels 1, 2 in this instance are a roof panel and a rear quarter outer panel, respectively. Referring to FIG. 3, a conventional joining jig 16 is constructed of a first contact section 4 having a contact surface 6 which is contactable with the inside face 5 of the joint section 3 or an upper edge section of the rear quarter outer panel 2 as shown in FIG. 2. A second contact section 7 is further provided having a contact surface 9 which is contactable with the outside face 8 of the joint section 3. The second contact section 7 is formed with an operation opening for a brazing torch which opening opens along the joint section 3. The first and second contact sections 4, 7 are respectively formed thereinside with coolant passages (not shown) to which coolant is supplied through hoses 11a, 11b and from which the coolant is discharged through hoses 11c, 11d. Each hose is connected at its one end with a coolant circulating system through a flow change valve though not shown, and at the other end with an inlet or outlet of the coolant passage of the first or second contact section 4, 7.

The first and second contact sections 4, 7 are pivotally connected with each other by means of a pivot 12, and are provided respectively with pressure receiving portions 13, 14. The pressure receiving portion 13 is provided at its tip with a manual clamp 15 of the spring-biased type which clamp serves as a biasing means. The clamp 15 is in cooperation with the pressure receiving portion 13 so that the pressure receiving portion 14 is put between them under pressure. Accordingly, the contact surface 6 of the first contact section 4 is urged to contact with the inside face of the joint section 3, while the contact surface 9 of the second contact section 7 is urged to contact with the outside face 8 of the joint section 3. It will be understood that the joining jig 16 of this manual clamp type is made up of the first and second contact sections 4, 7, the hoses 11a, 11b, 11c, 11d, the pivot 12, the pressure receiving portions 13, 14, and the clamp 15 upon assembled with each other. Additionally, an end of a suspending member 17 is connected to this joining jig 16 while the other end of the member 17 is connected to a suspended wire 19 of a spring balancer 18 which is pendent from a frame (not shown).

In order to carrying out the joining and padding formation by using the above-discussed joining jig 16, first the restraint to the pressure receiving portion 14 by the clamp 15 and the pressure receiving portion 13 is released by an operator. Then, the first and second contact sections 4, 7 are separated from each other to put the joint section 3 between the first and second contact sections 4, 7. Subsequently, the first and second contact sections 4, 7 are closed to each other so that the contact surface 6 of the first contact section 4 is brought into contact with the inside face of the joint section 3 while the contact surface 9 of the second contact section 7 is brought into contact with the outside face of the joint section 3. Thereafter, the pressure receiving portion 14 is restrained under pressure by the clamp 15 and the pressure receiving portion 13, thereby causing the contact surfaces 6, 9 of the contact sections 4, 7 to contact with the joint section 3 under pressure. A brazing torch (not shown) is inserted to approach the joint section 3 through the operation opening 10 of the second contact section 7, and the brazing torch is moved along the length of the operation opening 10 in which the peripheral edge of the opening 10 serves as a guide for the brazing torch, thus carrying out a joining operation of the adjoining panels 1, 2 and a padding formation on the joint section 3.

Figure 4:
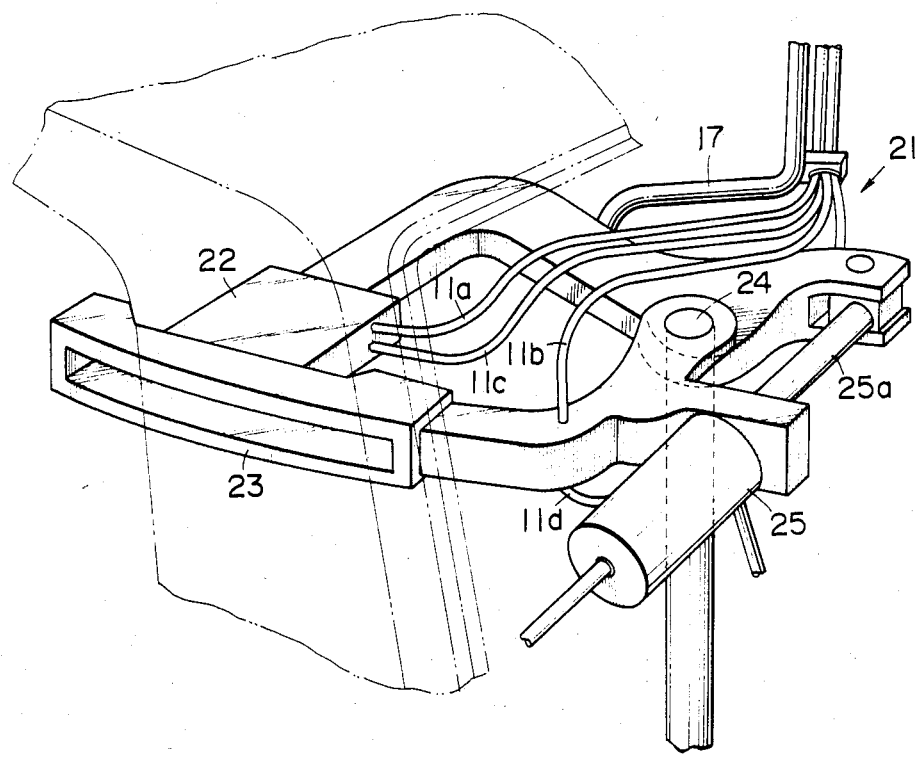
FIG. 4 is a perspective view of another conventional joining jig equipped with a hydraulically operated biasing device, for use in joining vehicle body outer panels.

FIG. 4 shows the other conventional joining jig 21 of the automatically pressuring type which is similar to that of FIG. 3 with the exception that a hydraulic cylinder 25 is used in place of the manual clamp 15 as the biasing means. This joining jig 21 is constructed of first and second contact sections 22, 23 which are pivotally connected with each other by means of a pivot 24 so that they are separable from and closable to each other. The hydraulic cylinder 25 is attached to an end portion of the second contact section 23, and its piston rod 25a is pivotally connected at its one end to an end portion of the first contact section 22 which end portion is located in opposition to the second contact section end portion. The first and second contact sections 22, 23 are provided with the hoses 11a, 11b, 11c and 11d for coolant supply and discharge, and also with the suspending member 17. Accordingly, this joining jig 21 is so operated that the opposed other end portions of the first and second contact sections 22, 23 are moved to separate from and close to each other by contracting and extending the piston rod 25a of the hydraulic cylinder 25, thus causing the contact surfaces of the first and second contact sections 22, 23 to contact with the joint section 3 respectively at its inside and outside faces under pressure.

However, the above-stated conventional joining jigs 16, 21 have unavoidably encountered the following drawbacks: With the joining jig 16 of the manual clamp type as shown in FIG. 3, the pressure applied to the joint section 3 is unstable and therefore there is a possibility of producing thermal strain in the joint section 3. Otherwise, with the joining jig 21 of the automatically pressurizing type using the hydraulic cylinder as shown in FIG. 4, a means for previously locating the joining jig relative to the vehicle body is not provided and accordingly it is impossible to precisely locate the jig at a desirable position of the vehicle body. This will causes the unevenness of the vehicle body outer panels when the hydraulic cylinder is operated in the condition where the location of the jig has not yet been complete.

Figure 5:
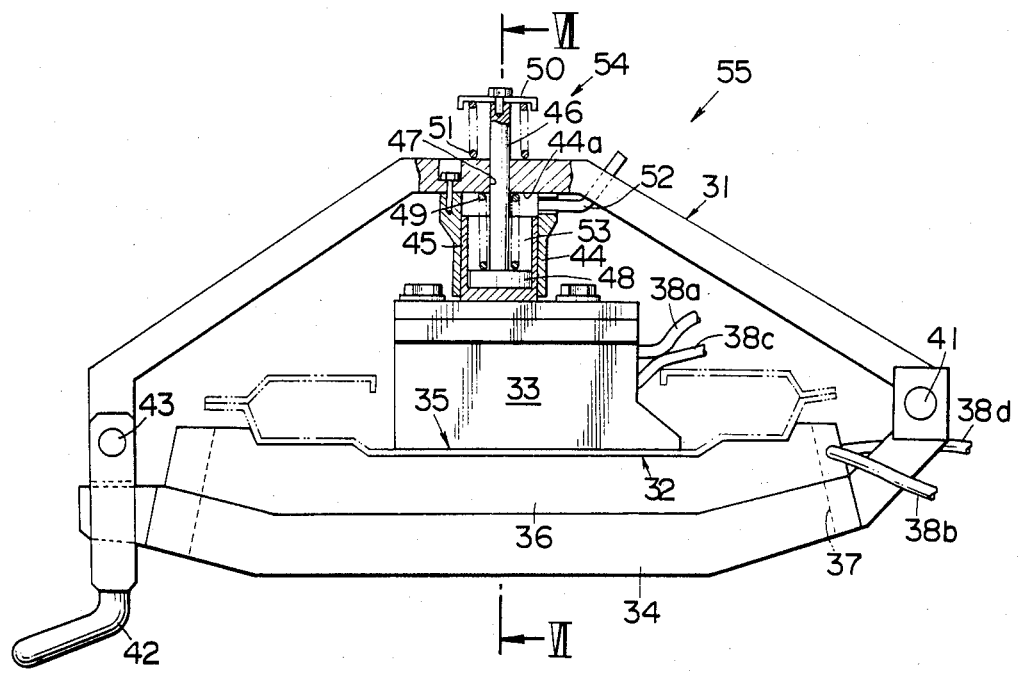
FIG. 5 is a plan view, partly in section, of an embodiment of a joining jig for use in joining vehicle body outer panels, in accordance with the present invention.
Figure 6:
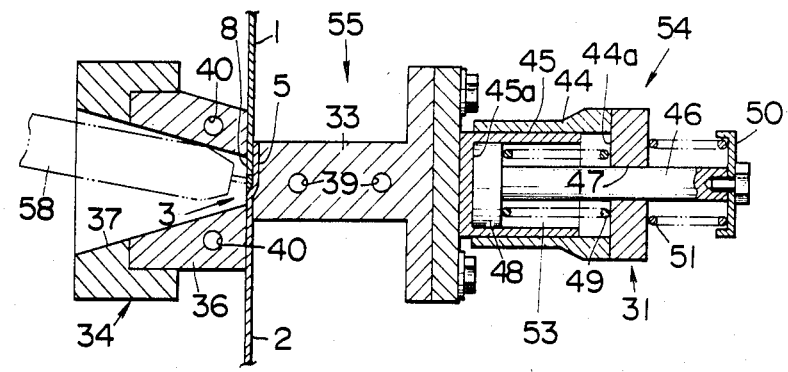
FIG. 6 is a cross-sectional view taken in the direction of the arrows substantially along the line VI—VI of FIG. 5.
Figure 7:
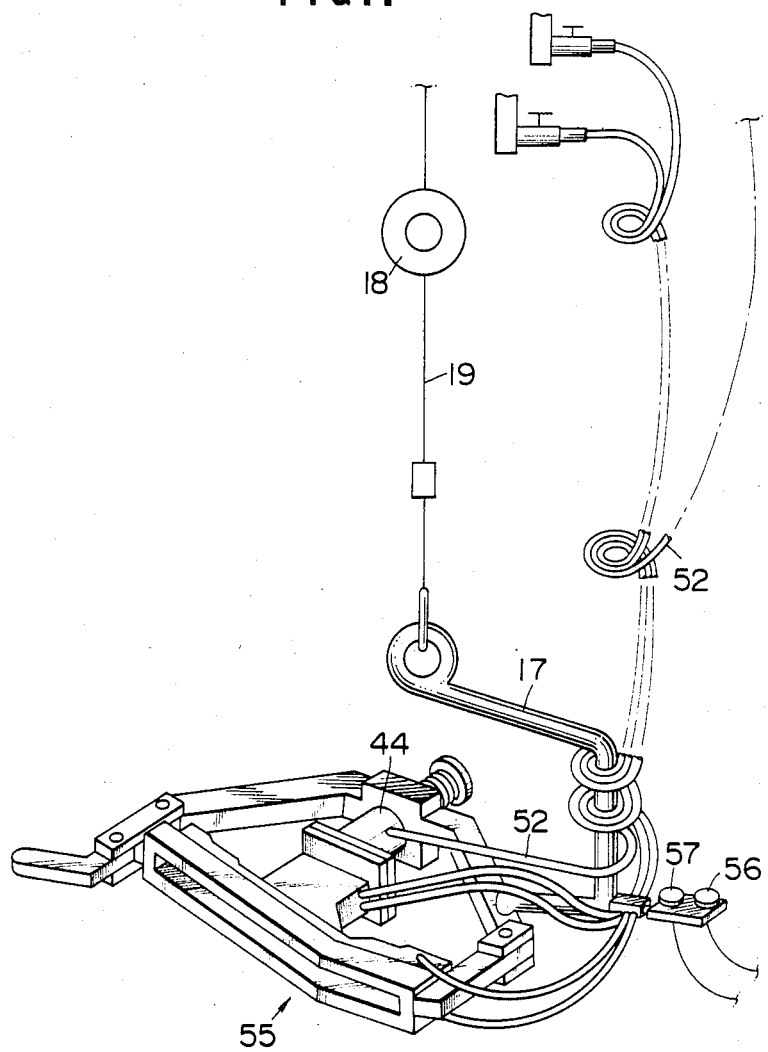
FIG. 7 is an overall perspective view of the joining jig of FIG. 5.

In view of the above description of the conventionl joining jigs, reference is now made to FIGS. 5 to 7, wherein an embodiment of the joining jig according to the present invention is illustrated by the reference numeral 55. In the explanation of this embodiment, the same reference numerals as in FIGS. 1 to 4 are assigned to the same parts and elements for the purpose of simplicity of illustration. The joining jig 55 comprises a first contact base member 31 which is provided with a contact member 33 having a contact surface 32 contactable with the inside face 5 of the upper edge section of the rear quater outer panel 2. A second contact base member 34 is provided with a contact member 36 having a contact surface 35 contactable with the outside face 8 of the joint section 3 of the roof panel 1 and the rear quarter outer panel 2.

The contact member 36 of the second contact base member 34 is formed with an operation opening 37 which is continuous through the contact member 6 and opened along the contact surface 35. The contact member 33, 36 are formed respectively with coolant passages 39, 40 (shown in FIG. 6) to which coolant is supplied through hoses 38a, 38b and from which coolant is discharged through hoses 38c, 38d. The first and second contact base members 31, 34 are pivotally connected at their one ends with each other by means of a pivot 41 so that they are separable from and closable to each other. A clamp 42 is swingably attached to the other end of the first contact base member 31 by means of a pin 43 and arranged to be capable of restraining the other end of the second contact base member 34, both the other ends of the first and second contact base members being separable from and closable to each other.

A hydraulic cylinder 44 of the hollow cylindrical type is secured at its one end to the first contact base member 31 in a manner to be closed at the same end with a part of the first contact base member 31, the cylinder 44 being opened at the other end constituting a free end. A hollow cylindrical piston 45 is sealingly and coaxially disposed within the hydraulic cylinder 44 to be axially movable therewithin. The piston 45 is opened at its one end located within the hydraulic cylinder 44 while closed at the other end located outside of the hydraulic cylinder 44, and secured to the contact member 33. It will be understood that a fluid tight seal is kept between the inner cylindrical surface of the cylinder 44 and the outer cylindrical surface of the piston 45 by means of a seal member through not shown.

A shaft 46 is movably inserted into the hydraulic cylinder 44 through a through-hole 47 formed in the first contact base member 31. A fluid tight seal is also kept between the outer surface of the shaft 46 and the inner surface of the through-hole 47 by means of a seal member (not shown). One end of the shaft 46 is secured to a plate 48 fixed to the inner surface 45a of the axial end of the piston 45, while the other end of the shaft 46 projects out of the first contact base member 31. A coil spring 49 capable of being compressed is disposed between the plate 48 and the inner surface 44a of the axial end of the cylinder 44 or the first contact base member 31 in a manner to surround a part of the shaft 46. This coil spring 49 functions always to bias the piston 45 in the direction to be pushed out of the cylinder 44, i.e., leftward in FIG. 6, thus constituting a biasing means for lightly biasing the contact surfaces 32, 35 of the first and second contact base member 31, 34 to contact with the joint section 3 under the action of a light pressure or biasing force. A spring seat member 50 is secured to the other end of the shaft 46 with a small screw. A coil spring 51 is disposed between the spring seat member 50 and the first contact base member 31 in a manner to surround a part of the shaft 46. This coil spring 51 is lower in biasing force than the coil spring 49, and functions always to bias the shaft 46 in the direction to be extracted from the piston 45, i.e., rightward in FIG. 6. Thus, the piston 45 and the contact member 33 secured to the piston 45 are normally lightly biased in the direction that the piston 45 is pushed out of the cylinder 44, i.e., toward the contact member 36, under the action of the difference in biasing force between the coil springs 51 and 49.

The hydraulic cylinder 44 is provided with a hose 52 whose one end is communicated with a hydraulic pressure chamber 53 defined by the hydraulic cylinder 44 and the piston 45, the other end of the hose 52 being connected to a hydraulic pressure or fluid source (not shown) through a flow change valve (not shown). It will be understood that a biasing means 54 is made up of the hydraulic cylinder 44, the piston 45, the seal members, the shaft 46, the plate 48, the coil springs 49, 51, the spring seat member 50, and the hose 52 upon assembled. The biasing means 54 functions to bias the contact surfaces 32, 35 of the contact members 33, 36 to contact with the joint section 3 under pressure. Thus, the joining jig 55 is made up of the first and second contact base members 31, 34, the hoses 38a, 38b, 38c, 38d, the pivot 41, the pin 43, the clamp 42, and the biasing means 54 as a whole upon assembled.

As shown in FIG. 7, the joining jig 55 is pendent by the suspended wire 19 of the spring balancer 18 through the suspending member 17 attached to the joining jig 55. The suspending member 17 is provided with a switch with push buttons 56, 57 which switch is connected to an actuator of the flow change valve (not shown) disposed in the hose 52 for hydraulic fluid supply. The switch with the push buttons 56, 57 are arranged to control the flow change valve so as to control the operation of the piston 45 within the hydraulic cylinder 44.

The manner of operation of the joining jig 55 will be discussed hereinafter.

Figure 1:
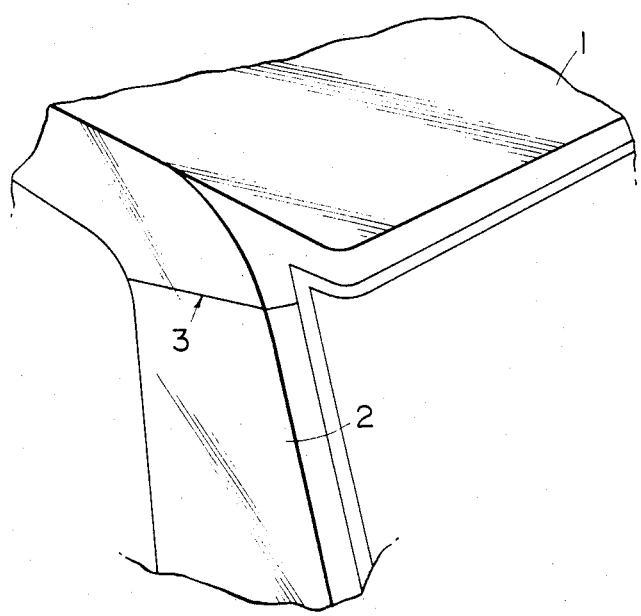
FIG. 1 is a segmentary perspective view showing a joint section of a roof panel and a rear quarter outer panel of an automotive vehicle (passenger car) body.

First, the restraining action of the clamp 42 to the second contact base member 34 is released by an operator to cause the first and second contact base members 31, 34 to separate from each other, maintaining a pivotal connection therebetween at the pivot 41. Then, the joint section 3 (as shown in FIGS. 1 and 2) of the automotive vehicle body which is being carried by a carrying system is put between the first and second contact members 33, 36. Subsequently, the first and second contact base members 31, 34 are closed to each other so that the contact surface 32 of the contact member 33 is brought into contact with the inside face 5 of the joint section 3 while the contact surface 35 of the contact member 36 is brought into contact with the outside face 8 of the joint section 3. Then, the second contact base member 34 is restrained by the clamp 42. Subsequently, the joining jig 55 is finely moved so as to precisely contact the contact surfaces 32, 35 with the desirable positions at the inside and outside surfaces of the joint section 3. At this time, the contact member 33 is biased toward the contact member 36 under a relatively light biasing force of the coil spring 49 as discussed above, and therefore an effective location of the joining jig 55 can be easily accomplished without damaging the vehicle body panels around the joint section 3.

When the button 56 is pushed by the operator to control the flow change valve for the hydraulic fluid, hydraulic fluid is supplied to the hydraulic pressure chamber 53 in the hydraulic cylinder 44, so that the piston 45 projects out of the hydraulic cylinder 44 compressing the coil spring 51 under the action of the shaft 46 and the spring seat member 50 thereby to cause the contact member 33 to contact with the inside face of the joint section 3 under pressure. By virtue of the reaction of this, the contact member 36 of the second contact base member 34 is biased to contact with the outside face 8 of the joint section 3 under pressure. As a result, the joint section 3 can be effectively put between the contact members 33, 36 under pressure. Then, a brazing torch 58 is inserted into a position as indicated in phantom in FIG. 6 through the operation opening 37 of the members 34, 36 and moved along the joint section 3 in which the peripheral edge portion of the operation opening 37 serves as the guide for the brazing torch 58, thus accomplishing the joining operation of the roof panel 1 and the rear quarter outer panel 2 providing a padding on the joint section 3.

During this arc brazing operation, both the contact members 33, 36 are cooled by the coolant flowing through the coolant passages 39, 40. When the arc brazing operation is completed, the brazing torch 58 is extracted from the operation opening 37 by the operator. Then, the push button 57 of the switch is pushed by the operator to operate the flow change valve to change the flow of the hydraulic fluid, so that the hydraulic fluid is discharged from the hydraulic pressure chamber 53 of the hydraulic cylinder 44. As a result, the piston 45 withdraws into the hydraulic cylinder 44 under the action of the restoring force of the coil spring 51 which has been contracted, and therefore the joint section 3 is released from being pressurized by both the contact mqmbers 33, 36. Thereafter, the restraint to the second contact base member 34 by the clamp 42 is released by the operator, and then the first and second contact base members 31, 34 are separated from each other to remove the joining jig 55 from the joint section 3. The thus removed joining jig 55 will be temporarily installed to the joint section of the automotive vehicle body which is successively carried in order to make a joining and padding formation operation in the same manner as discussed above.

As appreciated from the above discussion, according to the present invention, the contact surfaces of the two opposite contact members are previously lightly contacted under the action of a relatively low biasing force prior to a strong contact under the action of a relatively high biasing force, thus enabling a precise location of the contact surfaces of the joining jig relative to the joint section. Therefore, the contact surfaces of the joining jig can tightly fit to the automotive vehicle body joint section of the shape corresponding to the contact surfaces, so that there is no possibility of forming an unevenness on the joint section when the joint section is put between the first and second contact sections under the action of the high biasing force. Additionally, since the pressure applied to the joint section by the contact surfaces is stable, the joint section can be effectively prevented from thermal strain.

What is claimed is:

1. A joining jig for use in joining adjoining panels of an automotive vehicle body comprising:
   a first contact section having a first contact base member, and a first contact member formed with a first contact surface which is contactable with an inside face of a joint section of the adjoining panels and said first contact member also being operatively connected to said first contact base member;

a second contact section having a second contact base member and a second contact member formed with a second contact surface which is contactable with an outside face of the joint section, said second contact base member being connectable with said first contact base member;

first biasing means including a hydraulic cylinder connected to said first contact base member and a hollow piston movably disposed in said hydraulic cylinder, said hollow piston being connected to said first contact member, said hollow piston defining therein a hydraulic pressure chamber for hydraulic fluid, said first biasing means providing a first biasing force for contacting said first and second contact surfaces with the corresponding faces of the joint section when operated by admitting hydraulic fluid into said hydraulic pressure chamber to act on said piston in a first direction to push said piston out of said cylinder; and second biasing means including a first spring means disposed within said hydraulic pressure chamber for biasing said piston in said first direction, said second biasing means further including a second spring means disposed outside of said hydraulic pressure chamber for biasing said piston in a second direction opposite said first direction, said second spring means having a lower biasing force than that of said first spring means, said second biasing means biasing said first and second contact surfaces into contact with the corresponding faces of the joint section prior to the operation of said first biasing means.

2. A joining jig as claimed in claim 1 wherein said joint section is of a joggled lap shape.

3. A joining jig as claimed in claim 1 wherein said second contact section is formed with an opening in which a brazing torch is insertable.

4. A joining jig as claimed in claim 1 in which said first contact section includes a first contact base member and a first contact member formed with said first contact surface and operatively connected and movable with respect to said first contact base member, and in which said second contact section includes a second contact base member and a second contact member formed with said second contact surface and fixedly connected to said second contact base member, said second contact base member being fixedly connectable with said first contact base member.

5. A joining jig as claimed in claim 4 wherein said first biasing means includes a hydraulic cylinder connected to said first contact base member, and a hollow piston movably disposed in said hydraulic cylinder and connected to said first contact member, said hollow piston defining thereinside a hydraulic pressure chamber to be filled with a hydraulic fluid.

6. A joining jig as claimed in claim 5 wherein said second biasing means includes a first spring for biasing said piston in a first direction to be pushed out of said hydraulic cylinder.

7. A joining jig as claimed in claim 4 wherein said first and second contact base members each have one end pivotally connected with each other and said jig includes a clamp for connecting said first and second contact base members at the other end thereof.

8. A joining jig as claimed in claim 1, wherein said second biasing means further includes a plate member disposed in a hollow of said piston and secured to an inner wall of said piston, said first coil spring being seated on said plate member, a shaft secured at its one end to said plate member and projecting out of said hydraulic pressure chamber through said first contact base member, and a spring seat member secured to the other end of said shaft, said second coil spring being disposed between said spring seat member and said first contact base member.

9. A joining jig for use in joining adjoining panels of an automotive vehicle body comprising:

a first contact section having a first contact base member, and a first contact member formed with a first contact surface which is contactable with an inside face of a joint section of the adjoining panels and said first contact member also being operatively connected to said first contact base member;

a second contact section having a second contact base member and a second contact member formed with a second contact surface which is contactable with an outside face of the joint section, said second contact base member being connectable with said first contact base member;

first biasing means including a hydraulic cylinder connected to said first contact base member and a hollow piston movably disposed in said hydraulic cylinder, said hollow piston being connected to said first contact member, said hollow piston defining therein a hydraulic pressure chamber for hydraulic fluid, said first biasing means providing a first biasing force for contacting said first and second contact surfaces with the corresponding faces of the joint section when operated by admitting hydraulic fluid into said hydraulic pressure chamber to act on said piston in a first direction to push said piston out of said cylinder; and second biasing means including a first spring means disposed within said hydraulic pressure chamber for biasing said piston in said first direction and a second spring means disposed outside of said hydraulic pressure chamber for biasing said piston in a second direction opposite said first direction, said second spring means having a lower biasing force than that of said first spring means.

* * * * *